United States Patent
Backman et al.

(10) Patent No.: US 6,187,868 B1
(45) Date of Patent: Feb. 13, 2001

(54) CHLORINATED POLYVINYL CHLORIDE COMPOUND HAVING EXCELLENT PHYSICAL, CHEMICAL RESISTANCE AND PROCESSING PROPERTIES

(75) Inventors: Arthur Leonard Backman; Bernard Frank Cinadr, both of Brecksville, OH (US)

(73) Assignee: The B. F. Goodrich Company, Brecksville, OH (US)

( * ) Notice: Under 35 U.S.C. 154(b), the term of this patent shall be extended for 0 days.

(21) Appl. No.: 09/320,030

(22) Filed: May 26, 1999

Related U.S. Application Data

(60) Division of application No. 09/038,592, filed on Mar. 11, 1998, now Pat. No. 5,981,633, which is a continuation-in-part of application No. 08/653,532, filed on May 24, 1996, now Pat. No. 5,821,304.

(51) Int. Cl.$^7$ ........................................................ C08F 8/20

(52) U.S. Cl. ............................ 525/222; 525/322; 525/235

(58) Field of Search .................................. 525/222, 233, 525/235

(56) References Cited

U.S. PATENT DOCUMENTS

| | | |
|---|---|---|
| 2,996,489 | 8/1961 | Dannis et al. . |
| 3,100,762 | 8/1963 | Shockney . |
| 3,264,375 | 8/1966 | Jones . |
| 3,334,077 | 8/1967 | Gateff . |
| 3,334,078 | 8/1967 | Gateff . |
| 3,453,347 | 7/1969 | Dreyfuss . |
| 3,506,637 | 4/1970 | Makino et al. . |
| 3,534,013 | 10/1970 | Wakabayashi et al. . |
| 3,591,571 | 7/1971 | Steinbach-Van Gaver . |
| 4,049,517 | 9/1977 | Adachi et al. . |
| 4,173,598 | 11/1979 | Casteiazo et al. . |
| 4,213,891 | 7/1980 | Wear . |
| 4,335,032 | 6/1982 | Rosenquist . |
| 4,350,798 | 9/1982 | Parker . |
| 4,362,845 | 12/1982 | Kamata et al. . |
| 4,377,459 | 3/1983 | Parker . |
| 4,381,361 | 4/1983 | Hardt et al. . |
| 4,412,898 | 11/1983 | Olson et al. . |
| 4,443,585 | 4/1984 | Goldman . |
| 4,459,387 | 7/1984 | Parker . |
| 4,680,343 | 7/1987 | Lee . |
| 4,745,156 | 5/1988 | Yoshihara et al. . |
| 4,894,415 | 1/1990 | Sasaki et al. . |
| 4,918,132 | 4/1990 | Hongo et al. . |
| 4,983,687 | 1/1991 | Lawson et al. . |
| 4,994,522 | 2/1991 | Sasaki et al. . |
| 5,086,122 | 2/1992 | Lawson et al. . |
| 5,132,359 | 7/1992 | Sasaki et al. . |
| 5,194,471 | 3/1993 | Hartitz . |
| 5,216,088 | 6/1993 | Cinadr et al. . |
| 5,268,424 | 12/1993 | Lawson . |
| 5,334,656 | 8/1994 | Yamamoto et al. . |
| 5,340,880 | 8/1994 | Backman et al. . |
| 5,359,022 | 10/1994 | Mautner et al. . |
| 5,603,998 | 2/1997 | Hartitz . |
| 5,604,278 | 2/1997 | Hartitz . |

FOREIGN PATENT DOCUMENTS

| | | |
|---|---|---|
| 0260552 | 3/1988 | (EP) . |
| 0308871 | 3/1989 | (EP) . |
| 0326041 | 8/1989 | (EP) . |
| 0343545 | 11/1989 | (EP) . |
| 0510310A | 10/1992 | (EP) . |
| 0603753A | 6/1994 | (EP) . |
| 0612602A | 8/1994 | (EP) . |
| 0695782A | 1/1996 | (EP) . |
| 4306252 | 10/1992 | (JP) . |

OTHER PUBLICATIONS

ASTM Designation: D256–93a, "Standard Test Method for Determining the Pendulum Impact Resistance of Notched Specimens of Plastics", pp. 1–18.

ASTM Designation: D638–94b, "Standard Test Method for Tensile Properties of Plastic", pp. 47–48.

ASTM Designation: D1784–90, "Standard Specification for Rigid Poly(Vinyl Chloride) (PVC) Compounds and Chlorinated Poly(Vinyl Chloride) (CPVC) Compounds", pp. 66–69).

ASTM Designation: D2444–93, "Standard Test Method for Determination of the Impact Resistance of Thermoplastic Pipe and Fittings by Means of a Tup (Falling Weight)", pp. 113–119.

ASTM Designation: D2846/D2846M–95a, "Standard Specification for Chlorinated Poly(Vinyl Chloride) (CPVC) Plastic Hot–and Cold–Water Distribution Systems", pp. 275–285.

ASTM Designation: D2990–93a, "Standard Test Method for Tensile, Compressive, and Flexural Creep and Creep–Rupture of Plastics", pp. 189–206.

Material Safety Data Sheet, Metablen S–2001, Elf Atochem North America, Philadelphia, PA, Jun. 4, 1992, pp. 1–4.

Elf Atochem North America, Inc. Information for CPVC/S–2001 Blends, Data 1, 2 and 3.

Material Safety Data Sheet and Raw Material Specification Form with cover sheet from Elf Atochem, Mitsubishi Rayon Co., Ltd. Feb. 3, 1992.

Raw Material Specification Form, Mitsubishi Rayon Co., Ltd. Dated Mar. 1993.

9 Sheets of Graphs, date unknown, on Various Properties of Metablen S–2001.

Data Sheet on Gloss Ratio and Yellow Index of PVC Sample Sheets Exposed in Okinawa.

(List continued on next page.)

*Primary Examiner*—Bernard Lipman
(74) *Attorney, Agent, or Firm*—Valerie L. Calloway; Thoburn T. Dunlap

(57) ABSTRACT

The present invention relates to a chlorinated polyvinyl chloride compound and an article made therefrom. The compound comprises a two step CPVC resin, chlorinated polyethylene as well as an impact modifier. The compound exhibits good physical properties, chemical resistance as well as ease of processability.

4 Claims, 3 Drawing Sheets

OTHER PUBLICATIONS

ASTM Designation: F441–94, "Standard Specification for Chlorinated Poly(Vinyl Chloride) (CPVC) Plastic Pipe, Schedules 40 and 80", pp. 743–748.

Product Data Sheet for Tyrin CPE 3615 Resin.

Product Data Sheet for Tyrin CPE 3611 Resin.

Product Data Sheet for Tyrin CPE 4211 Resin.

Translation of Japanese Kobunshi Ronbunshu, "Synthesis and Analysis of Morphology of Silicon/Arcyl Compound Rubber", Vo., 50, No. 5, pp. 391–395 (May 1993).

Technical Bulletin S–1, METABLEN™ S–2001, "Super–Hi Impact/Super–Weather–Resistant Modifier for PVC", Mitsubishi Rayon Company, Ltd.

2 Sheets of DSC data from Metablen S–20001.

7 Sheets of Data on Izod Impact Strength, Weatherability, Heat Discoloration, Impact Modification for Metablen S–2001, dated Sep., 1992.

European Search Report for European Application 96118590.7 mailed Mar. 23, 1998. 96118590.7 is the European counterpart to the U.S. priority application for the captioned application.

CHLORINATED POLYVINYL CHLORIDE COMPOUND HAVING EXCELLENT PHYSICAL, CHEMICAL RESISTANCE AND PROCESSING PROPERTIES

RELATED APPLICATIONS

This is a divisional of application Ser. No. 09/038,592, which was filed on Mar. 11, 1998, now U.S. Pat. No. 5,981,633, which is a continutation-in-part of U.S. Ser. No. 08/653,532, filed May 24, 1996, now U.S. Pat. No. 5,821,304.

FIELD OF INVENTION

This invention relates to a unique compound having good physical properties including heat deflection temperature, impact strength, tensile strength and modulus of elasticity. In particular, the invention relates to chlorinated polyvinyl chloride compound which at a minimum meets ASTM D 1784 cell class 23447, while maintaining suitable processability and good chemical resistance. Furthermore, the invention relates to an article made from this unique compound.

BACKGROUND OF THE INVENTION

Chlorinated polyvinyl chloride (CPVC) is known to have excellent high temperature performance characteristics, among other desirable physical properties. Typically, CPVC has an excess of 57% bound chlorine. CPVC is conveniently made by the chlorination of polyvinyl chloride (PVC) by any one of several available methods including a solution process, a fluidized bed process, a photo-slurry process, a thermal process or a liquid chlorine process. Examples of these processes can be found in U.S. Pat. Nos. 2,996,489; 3,100,762; 4,412,898; 3,532,612; 3,506,637; 3,534,013; 3,591,571; 4,049,517; 4,350,798; and 4,377,459.

CPVC is an important specialty polymer due to its high glass transition temperature, high heat deflection temperature, outstanding flame and smoke properties and chemical inertness. The glass transition temperature of the CPVC generally increases as the amount of chlorine increases. It is also known that CPVC resins have low impact properties. However, as the chlorine content increases, the CPVC becomes more difficult to process and becomes more brittle.

The increased demand for CPVC pipe, vessels, valves, fitting and other articles has provided a significant incentive to develop a better impact modified CPVC having increased heat deflection temperatures which have an increased ease of processing. Most of the efforts have been channeled to rigid CPVC applications where acceptable impact strength and dimensional stability under heat are critical. These include the manufacture of exterior structural products, rigid planes, pipes, conduits, injection molded and various other containers.

European Patent Application 0343545A2 to Lawson discloses a composition of crosslinked CPVC which has good melt strength yet improved processing properties such as reduced melt temperatures as well as reduced torque processing characteristics. However, in Table II, Recipe 1, Lawson also discloses a CPVC compound comprising a blend of CPVC resin formed by the use of a photo-slurry process having an inherent viscosity of 1.1 and 68.5% chlorine which is not crosslinked, an acrylic impact modifier and chlorinated polyethylene. In addition, European Patent Application 0603753 A1to Hartitz dicloses a CPVC compound intended for low shear extrusion. The compound comprises CPVC resin having from 69% to 74% by weight chlorine; an acrylic impact modifier, a first chlorinated polyethylene containing from 32 to 37% by weight of chlorine and a Mooney viscosity of from 25 to 45, and a second chlorinated polyethylene containing from 36 to 42% chlorine and a Mooney viscosity of from 60 to 95. Compression molded plaques derived from compound exhibit a good balance of tensile strength, tensile modulus, Izod impact strength, heat deflection temperature and dynamic thermal stability.

U.S. patent application Ser. No. 08/565,910, filed Dec. 1, 1995 by Forsyth, et.al., discloses plastic pipe, fittings and other piping appurtenances which are prepared from CPVC formulations and meet the requirements of ASTM D 1784, cell class 23448-B. The CPVC resin used in these formulations has a specified weight percent of chlorine of at least 70%. The formulation includes impact modifiers, and other optional ingredients.

European Patent Application EP 0695782 A1 discloses a CPVC compound comprising a blend of a CPVC and an impact modifier containing a polyorganosiloxane. In Table 1, Compound #3, a CPVC resin containing 72% chlorine is used in conjunction with an impact modifier containing a polyorganosiloxane.

Although these various compounds exist, there still exists a need for a CPVC composition which has a high heat deflection temperature as well as good physical properties, chemical resistance and can be easily processed.

ASTM D 1784 sets forth the standard specifications for rigid CPVC compositions for general purpose use in extruded or molded form. In addition to the CPVC resin, the compound may include lubricants, stabilizers, non-poly (vinyl chloride) resin modifiers, pigments and inorganic fillers. The standard specifications are identified in terms of cell classifications, which are indicative of certain physical properties of the formulations. Cell Class 23447 identifies certain commercially available CPVC compounds. The first digit (2) identifies the base resin as CPVC. The second (3) and third (4) digits identify impact strength and tensile strength characteristics. The fourth (4) and fifth digits (7) identify the modulus of elasticity and the heat deflection temperatures.

|   | Property and Unit | Cell Limit |
|---|---|---|
| 2 | Base Resin | CPVC |
| 3 | Impact Strength (Izod), J/m | 80.1 |
|   | ft.lb./in. | 1.5 |
| 4 | Tensile Strength, MPa | 48.3 |
|   | psi. | 7,000 |
| 4 | Modulus of Elasticity, MPa | 2482 |
|   | psi. | 360,000 |
| 7 | Heat Deflection Temperature, ° C. | 100 |
|   | ° F. | 212 |

It is desirable to increase the heat deflection temperature to levels greater than 212° F. However, by doing so, a general degradation is seen in one or more of the physical properties of the article made from such a compound. For example, simply increasing the chlorine content of the compound degrades impact strength levels below those mandated by ASTM D 1784. Adding or changing impact modifiers to compensate can degrade tensile strength and modulus of elasticity. Moreover, even if all the physical properties are maintained, the processability of the CPVC compound is at issue. A compound cannot degrade while being processed.

Dynamic thermal stability (DTS) is a measure of the processability of the CPVC compound. DTS is designed to measure the time-torque relationship of a particular formulation at a selected temperature using a Brabender Plasticorder or a Haake Rheocord 90 or the like. The test value used for comparison is DTS time. Unless specified otherwise, DTS time is defined as time at a particular temperature and rotor speed, herein 210° C./35 rpm, required for the instrument torque to fall to minimum value with the polymer compound in the molten state, before beginning to increase, presumably due to instability and accompanied by autogenous crosslinking.

Thus, there currently exists a need for a CPVC composition having a balance of good physical properties, and chemical resistance, which can be easily processed. In particular, a need exists for a CPVC compound which at a minimum meets the cell class 23447 of ASTM D 1784 which is easy to process. More particularly, there exits a need for a CPVC composition which has at a minimum a heat deflection temperature above 212° F. and has a balance of physical properties as well as chemical resistance.

SUMMARY OF THE INVENTION

The present invention comprises a novel CPVC compound meeting at a minimum ASTM D 1784 cell class 23447, while maintaining suitable processability. In particular, the present invention comprises a unique CPVC compound comprising CPVC resin made from a novel Two Step process, and two impact modifiers. The impact modifiers are chlorinated polyethylene and a second impact modifier chosen from the group consisting essentially of acrylic impact modifiers, methacrylate-butadiene styrene (MBS) impact modifiers, acrylonitrile-butadiene-styrene (ABS) impact modifiers and impact modifiers containing a polyorganosiloxane. The two impact modifiers can be added separately or can be blended together prior to their addition to the compound.

Another aspect of the invention is an article made from the novel CPVC compound which has a heat deflection temperature of at least 212° F., while maintaining suitable processability, physical properties and chemical resistance.

DETAILED DESCRIPTION

Figure 1:
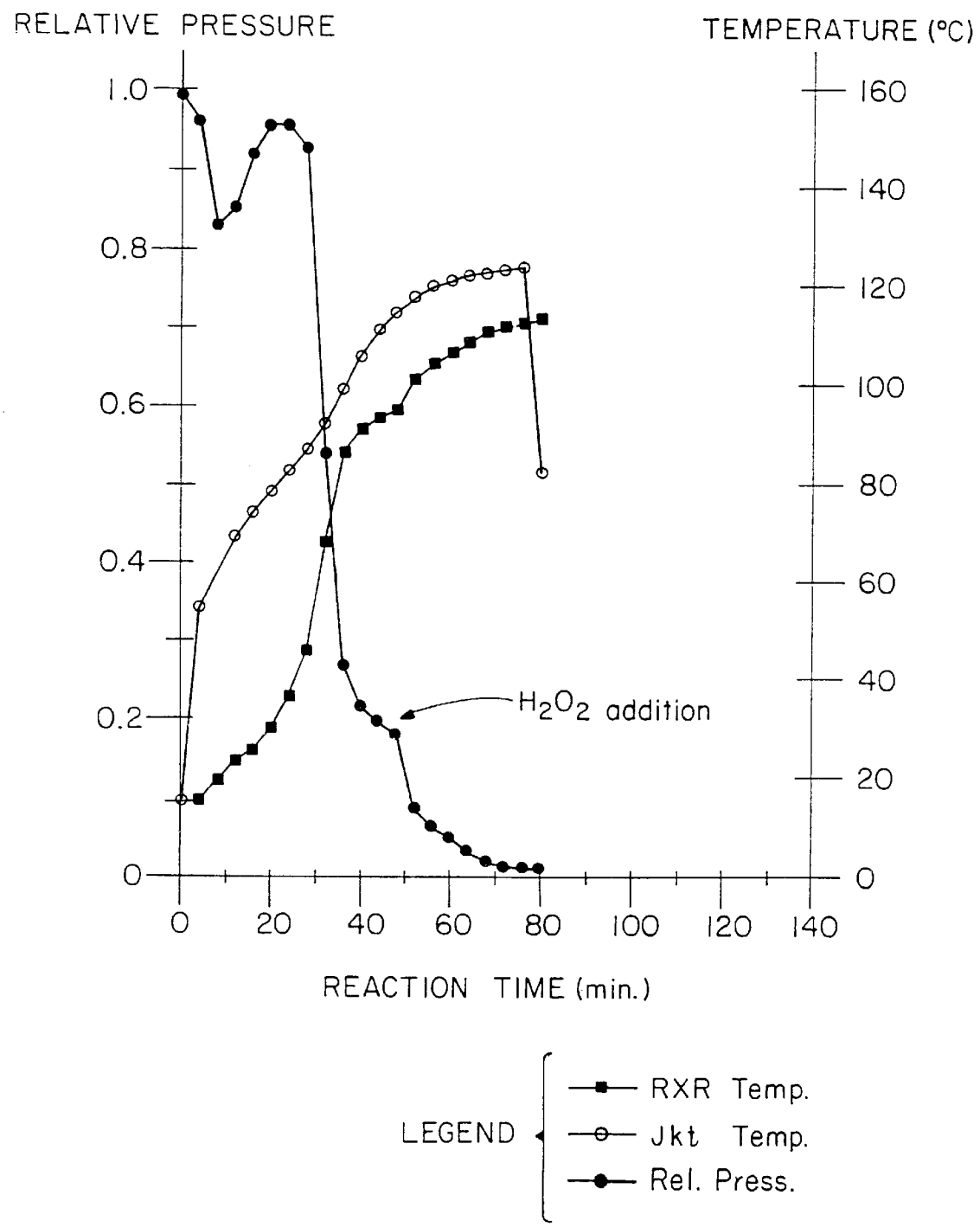
FIG. 1 graphically illustrates the Two Step chlorination of PVC as described further in Example 1 using a 200 gallon reactor in which the relative pressure of chlorine, the temperature of the reactor's jacket and the temperature of the reaction mass are plotted as a function of time during which the reaction proceeds until the desired 69.5% chlorine content of the CPVC is achieved.

The CPVC compound of the instant invention comprises a novel blend of a CPVC resin formed by a Two Step process and having a chlorine content in the range of 67% to 75%, chlorinated polyethylene and a second impact modifier. Other ingredients generally added to chlorinated polyvinyl chloride compositions, such as, for example, but not limited to lubricants, processing aids and pigments may also be optionally included in the CPVC compound.

The CPVC resin to be used in the instant invention is produced by a Two Step process which comprises post chlorinating PVC in the presence of an peroxy catalyst during both steps. The process is fully described in U.S. Pat. Nos. 5,216,088 and 5,340,880, incorporated in their entirety herein by reference. The process will hereinafter be referred to as the Two Step Process. CPVC resin formed by this Two Step Process will be hereinafter referred to a Two Step CPVC Resin.

The PVC used in the process is a homopolymer in the form of macrogranules obtained by either mass, suspension or emulsion polymerization techniques. Macrogranules are clusters or aggregates of randomly, closely packed primary particles of polymers. Typically PVC macrogranules used in the process will have an average diameter in excess of 20 micrometers. A preponderance of the particles are in excess of 50 micrometers ($\mu$m) in diameter. Preferably, macrogranules have a size distribution in the range of 50 $\mu$m to 500 $\mu$m. Each macrogranule is made up of a multiplicity of particles in the size range of from 0.05 $\mu$m to 5 $\mu$m. In addition, the PVC homopolymer has a chlorine content in the range of from about 55% to 58%.

An interdependence exists between the process used to form the CPVC and the starting PVC material; therefore, it is difficult to particularly choose the starting material. However, the preferred PVC preferably has a high molecular weight, possessing an inherent viscosity in the range of 0.5 to about 1.4. The most preferred PVC is a suspension polymerized PVC having a porosity in the range of 1.0 m$^2$/g to 3.0 m$^2$/g and an inherent viscosity in the range of 0.85 to 1.2. An example of a commercially available preferred PVC to be used in the process is Geon 103 EP F-76 TR PVC, available from The Geon Company.

Alternatively, other vinyl chloride resins may be used. In particular, resins containing a major portion by weight of vinyl chloride; the remainder being one or more suitable monoolefinically unsaturated comonomers. Examples of possible comonomers include, vinylidene chloride, olefins such as ethylene and propylene, vinyl aromatics such as styrene, vinyl esters such as vinyl acetate, acrylic acids and their derivatives such as ethyl acrylate, acrylamide and acrylonitrile and vinyl heterocyclic compounds such as pyridine. Preferably, the other resins should contain more than 70% by weight of vinyl chloride.

The peroxy catalyst used in the Two Step Process which will be discussed in greater detail below is selected from the group consisting of peroxy carboxylic acid esters, diorganoperoxy carbonates, diacyl peroxides and mixed anhydrides of organic sulfoperacids with carboxylic acids or mixtures thereof. Typically a mixture of catalysts is used; one catalyst decomposing at a lower temperature than the other during the first step. The peroxy catalysts should have a 10 hour half life in the range of 30–130° C.

Preferred peroxyesters, particularly for the first step of the process are t-amylperoxyneodecanote (Lupersol 546M75); 3-hydroxy-1,1-dimethylbutylperoxyneodecanoate (Lupesol 610M50); 1,1-dimethyl-3-hydroxybutylperoxyneoheptanoate (Lupersol 688M50); t-butylperoxypivalate (Lupersol 11); t-butylperoxyneodecanoate (Lupersol 10); di(2-ethylhexyl)- peroxydicarbonate (Lupersol 223); di(sec-butyl) peroxydicarbonate (Lupersol 225); and acetylcyclohexyl-sulfonylperoxide (Lupersol 228-Z). Lupersol is a trademark of Atochem and is available from Atochem North America, Inc., Organic Peroxides Division (hereinafter "Atochem").

Most preferred peroxy catalyst for the first step is a hydroperoxide having the structure selected from the group

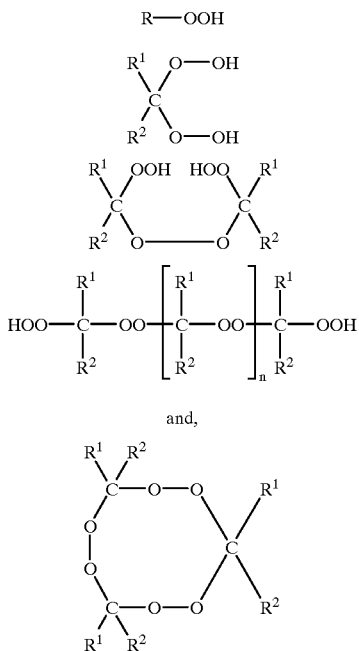

and, where R is a hydrocarbyl group having from 4 to 24 carbon atoms; $R^1$ and $R^2$ represent $C_1$–$C_{20}$ alkyl, or $C_7$–$C_{24}$ aralkyl, most preferably $C_1$–$C_6$ alkyl, and $R^1$ and $R^2$ may be the same or different, and n represents an integer in the range of 1 to 6, preferably 1,2,3,or 4. The preferred catalysts for the first step of the reaction include Lupersol Delta X-9 MEK, DHD-9, DDM-9; all these catalysts are available from Atochem. The most preferred catalysts for the first step of the Two Step Process are Lupersol Delta X-9 or DHD-9, available from Atochem.

Preferred peroxyesters, particularly useful for the second step are t-butylperoxy-2-ethylhexanoate (Lupersol PMS) and t-butylperoxybenzoate. Both of these peroxyesters are available from Atochem. The most preferred catalyst for the second step is hydrogen peroxide.

Combinations of t-butylperoxypivalate, (available as Lupersol 11 from Atochem), and acetylcyclohexylsulfonylperoxide, (available as Lupersol 228-Z from Atochem), or methylethylketoneperoxide (available as Lupersol Delta X-9 or DHD-9 from Atochem) and t-butylperoxy-2-ethylhexanoate (available as Lupersol PMS from Atochem) are particularly effective.

Typically, PVC granules are slurried in deionized water at room temperature in a jacketed pressurizable reactor, suitable for wet chlorine and hot hydrogen chloride service. Preferably the reactor is fitted with a stirrer. Generally, the suspension comprises from about 15 to about 35% by weight of PVC solids.

Oxygen must be removed from the aqueous suspension and from the PVC macrogranules prior to the initiation of the chlorination process in order to obtain the desired CPVC product. The removal of oxygen can be done by any conventional means. Removal of oxygen may also be assisted by agitation of the suspension. A possible way to remove the oxygen is to bring the slurry up to 35° C. and sparge it with nitrogen. Alternatively, the slurry can be heated to between 50–75° C. and then subjected to vacuum. The measure of oxygen in the slurry should be less than 50 ppm, preferably less than 5 ppm.

A substantially stoichiometric amount of chlorine is introduced, either as a liquid or gas, sufficient to produce the desired chlorine content in the CPVC end product. Generally, a substantially stoichiometric amount includes a small excess of less than 10 wt. % over the stoichiometric amount of chlorine. The amount is insufficient to provide a distinct chlorine liquid phase. The chlorine swells the PVC macrogranules.

The peroxy catalyst for both steps may be added at the outset or separately for the first step and then consequentially at the start of the second step. Preferably, a mixture of catalysts is added at the beginning of the process; one catalyst decomposes at a lower temperature than the other. Typically from about 0.005 to about 0.5% by weight of the catalyst is added based upon PVC weight.

The pressure at which the reaction is carried out depends upon the peroxy catalyst used, the amount of chlorine charged and the temperature at which the reaction is carried out. The higher the temperature, the more quickly the polyvinyl chloride resin will be chlorinated. Preferably, the pressure is in the range of 25 psig to 300 psig.

Upon initiation of the chlorination reaction in the first step, the reaction mass gradually increases in temperature. The temperature is maintained below 100° C. until the relative pressure of the chlorine begins to decrease and then stabilize. This marks the end of the first step of the process.

In the second step, the chlorination reaction continues by raising the temperature to around 130° C. A catalytic amount of oxygen containing gas (optionally generated in situ) is introduced to increase the speed of the reaction since the rate of the reaction to produce very high chlorine CPVC resin may be too slow to be commercially viable. Preferably, from about 5 ppm to less than 100 ppm of molecular oxygen is introduced. In addition, a substantially stoichiometric amount of chlorine is maintained. Generally from 0.5 to 10% excess of the stoichiometric amount of chlorine is used. However, this amount is dependent upon the chlorine content of the end product desired.

The reaction is continued until the relative pressure of the chlorine is less than 0.1 and the desired level of chlorine in the polymer is obtained. The desired level is at least 3% higher than the level that is achieved during the first step of the process.

Upon completion of the second step, the reactor is depressurized and the CPVC in the slurry is conventionally recovered. Typically, the slurry is filtered and washed with water, then dried in a convection oven or hot air tower where the wet resin is recirculated with hot air until dry. The CPVC resin formed by this process has a lower concentration of chlorine near its surface causing the CPVC end product to fuse at the same temperature as other CPVC resins made by conventional techniques and having lower chlorine contents.

Any Two Step CPVC Resin formed according to the Two Step Process can be used in the compound. Preferably, the Two Step CPVC Resin has a chlorine content greater than 70%. Most preferably, the Two Step CPVC Resin has a chlorine content of 70.6%.

In addition, blends of various CPVC resins can also be used. In those instances, the CPVC resin can be blended with another CPVC resin, whether produced by the Two Step Process or any conventional method, in an amount of other resin of about 1% to about 50%, provided that the composition does not loose its properties and ASTM D 1784 cell classification 23447.

The chlorinated polyethylene (CPE) used in the compound is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. Generally to be used as an impact modifier, the CPE material contains from 5 to 50% by weight of chlorine. Preferably, the CPE contains from 25 to 45% by weight of chlorine. CPE is commercially available from The Dow Chemical Company. The preferred CPE materials to be used in the compound include Tyrin 2000 and Tyrin 3615P; both available from the Dow Chemical Company. Tyrin is a trademark of the Dow Chemical Company. The most preferred CPE material is Tyrin 3615P, from the Dow Chemical Company. Additionally, the CPE can comprise a mixture of chlorinated polyethylenes, provided that the overall mixture has a chlorine content in the range of about 25 to 45% by weight chlorine. The CPE is added to the Two Step CPVC Resin in the range of from about 1 to 10 parts per hundred parts of Two Step CPVC Resin. Preferably, the amount of CPE added to the compound is 2.5 to 7.0 parts per 100 parts of the Two Step CPVC Resin. Most preferably, the amount of CPE added to the compound is 7.0 parts per 100 parts of the Two Step CPVC Resin.

An impact modifier can be used in the compound of the present invention in addition to the Two Step CPVC Resin and the CPE. Examples of impact modifiers include acrylic impact modifiers, methacrylate-butadiene-styrene (MBS) impact modifiers, acrylonitrile-butadiene-styrene (ABS) impact modifiers and impact modifiers containing a polyorganosiloxane. Furthermore, blends of these second impact modifier can be used in the instant invention. The most preferred impact modifier is composed of a mixture of a polyorganosiloxane and a polyalkyl(meth)acrylate. Preferably, this most preferred impact modifier contains about 10–90% by weight of the polyorganosiloxane and from about 10 to 90% by weight of a polyalkyl(meth) acrylate.

The polyorganosiloxane impact modifiers may be prepared by emulsion polymerization using an organosiloxane and a crosslinking agent as described hereinafter. At that time, a grafting agent may further be used.

The organosiloxane may be various types of cyclic siloxanes of at least three-membered ring, preferably from 3- to 6-membered cyclosiloxanes.

For example, it is believed hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane can be used. These organosiloxanes may be used alone or in combination as a mixture of two or more different types. The organosiloxane is used in an amount of at least 50% by weight, preferably at least 70% by weight of the polyorganosiloxane.

The crosslinking agent for the organosiloxane may be a trifunctional or tetrafunctional silane type crosslinking agent such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them tetraethoxysilane is especially preferred. The crosslinking agent is used usually in an amount of from 0.1 to 30% by weight in the polyorganosiloxane.

The grafting agent for the organosiloxane may be a compound capable of forming a unit represented by the formula:

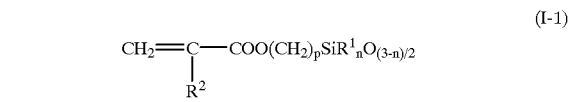

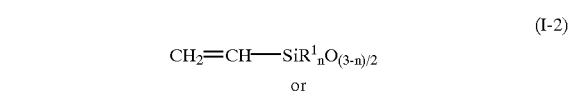

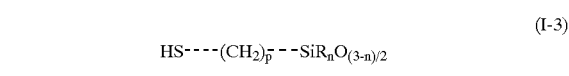

wherein $R^1$ is a methyl group, an ethyl group, a propyl group or a phenyl group. $R^2$ is a hydrogen atom or a methyl group, n is 0, 1 or 2, and p is a number o from 1 to 6.

The polyorganosiloxane can be prepared by any method in which the organosiloxane, the crosslinking agent and optionally the grafting agent are mixed. The preparation is well within the scope of one of ordinary skill in the art, and does not form part of this invention.

The polyorganosiloxane can be compounded with (meth) acryloyloxysiloxane capable of forming the unit of the formula (I-1). A methacryloyloxysilane is particularly preferred as the compound capable of forming the unit of the formula (I-1). Specific examples of the methacryloyloxysilane include β-methacryloyloxyethyldimethoxymethylsilane, τ-methacryloyloxypropylmethoxydimethylsilane, τ-methacryloyloxypropyldimethoxymethylsilane, τ-methacryloyloxypropyltrimethoxysilane, τ-methacryloyloxypropylethoxydiethylsilane, τ-methacryloyloxypropyldiethoxymethylsilane and δ-methacryloyloxybutyldiethoxymethylsilane. The grafting agent is used usually in an amount of from 0 to 10% by weight in the polyorganosiloxane.

The polyalkyl(meth)acrylate may be prepared using an alkyl(meth)acrylate, a crosslinking agent and a grafting agent. The alkyl(meth)acrylate may be an acryl acrylate such as methyl acrylate, ethyl acrylate, n-propyl acrylate, n-butyl acrylate or 2-ethylhexyl acrylate, or an alkylmethacrylate such as hexyl methacrylate, 2-ethylhexyl methacrylate or n-lauryl methacrylate. It is particularly preferred to use n-butyl acrylate. The crosslinking agent for the alkyl(meth) acrylate may be, for example, ethylene glycol dimethacrylate, propylene glycol dimethacrylate, 1,3-butylene glycol dimethacrylate or 1,4-butylene glycol dimethacrylate. The grafting agent for the alkyl(meth) acrylate may be, for example, allyl methacrylate, triallyl cyanurate or triallyl isocyanurate. Allyl methacrylate can be used alone as a crosslinking agent. The preparation of the polyalkyl(meth)acrylate is well within the scope of one of ordinary skill in the art and does not form part of this invention.

The two components, the polyorganosiloxane and the polyalkyl(meth)acrylate, can be polymerized together to form the impact modifier in a manner such as for example described by European Patent EP 0308871 A2, incorporated herein by reference. Any other method may be used to combine the two components, including those known within the art. The polymerization of the two components is well within the scope of one of ordinary skill in the art and does not form part of this invention.

Most preferably, the impact modifier comprises a butyl acrylate-methyl methacrylate-poly(dimethyl siloxane)

copolymer. An example of a commercially available polyorganosiloxane impact modifier is Metablen-S-2001 manufactured by the Mitsubishi Rayon Co. and available from Metco North America. Desirably, from about 1 parts to about 15 parts of the impact modifier containing polyorganosiloxane per 100 parts of Two Step CPVC Resin are added to the Two Step CPVC Resin. Most preferably 4.0 parts of the impact modifier containing a polyorganosiloxane are added.

Alternatively, acrylic impact modifiers can also be used as the second impact modifier in the instant invention. U.S. Pat. No. 3,678,133 describes the compositions conventionally referred to as acrylic impact modifiers. Generally, as stated in column 2 of U.S. Pat. No. 3,678,133, the impact modifier is a composite interpolymer comprising a multi-phase acrylic base material comprising a first elastomeric phase polymerized from a monomer mix comprising at least 50 wt. % of an alkyl acrylate having about 2–8 carbon atoms in the alkyl group and a minor amount of a crosslinking agent and a second rigid thermoplastic phase polymerized from a monomer mix comprising at least 50% alkylmethacrylate having 1–4 carbon atoms in the alkyl group and having a molecular weight of from 50,000 to 600,000. (Lines 10–20). Further, the patent states that the polymerization of the rigid thermoplastic phase is preferably conducted in such a fashion that substantially all of the rigid phase material is formed on or near the surface of the elastomeric phase. (Lines 34–39). Acrylic impact modifiers are polyacrylates including ($C_4$–$C_2$) acrylate homo or copolymers, second stage graft copolymerized with methyl methacrylate, polybutyl acrylate jointly graft copolymerized with methyl methacrylate and styrene, poly(ethylhexyl acrylate-co-butyl acrylate) graft copolymerized with styrene, and/or acrylonitrile and/or methylmethacrylate; polybutyl acrylate graft polymerized with acrylonitrile and styrene (Blendex 975, 977 or 979 (Blendex is a trademark of GE Plastics)). Other commercial embodiments are available from Rohm & Haas under the trademarks Paraloid KM 334, KM 365 and KM 330. The most preferred acrylic impact modifier is Paraloid KM 334 impact modifier. If used as an impact modifier in the composition, 4 parts of the Paraloid KM 334 acrylic impact modifier are added.

MBS impact modifiers are graft polymers. Generally, MBS impact modifiers are prepared by polymerizing methyl methacrylate or mixtures of methyl methacrylate with other monomers in the presence of polybutadiene or polybutadiene-styrene rubbers. Further information on MBS impact modifiers can be found in the Second Edition of the *Encyclopedia of PVC,* edited by Leonard I. Nass, Marcel Dekker, Inc. (N.Y. 1988, p. 448–452). Examples of commercially available MBS impact modifiers include Kane Ace B-56 and Kane Ace B-22 impact modifier, available from Kaneka; and Paraloid KM 680 impact modifier, available from Rohm & Haas. The most preferred impact modifier is Kane Ace B-22 impact modifier. If used in the instant invention, 4 parts of the Kane Ace B-22 impact modifier is added.

Similarly, ABS impact modifiers can be used in instant compounds. ABS modifiers are usually prepared by grafting styrene and acrylonitrile monomers onto polybutadiene rubber styrene-butadiene rubber substrates in emulsion. Further information on ABS impact modifiers can be found in the Second Edition of the *Encyclopedia of PVC,* edited by Leonard I. Nass, Marcel Dekker, Inc., (N.Y. 1988, p. 453–459). Examples of commercially available ABS impact modifiers which can be used in the instant invention include Blendex 338, Blendex 310 and Blendex 311; all available from GE Plastics. If used as the impact modifier of choice, 4 parts of ABS impact modifier are used. If the ABS impact modifier is used, the preferred ABS impact modifier is Blendex 310 impact modifier.

Additives can also be added to the unique compound as needed. Conventional additives known in the art as well any other additives may be used, provided that the additive does not alter the unique combination of physical properties and processability associated with the novel compound. Examples of additives which can be used include antioxidants, lubricants, stabilizers, impact modifiers, pigments, glass transition enhancing additives, processing aids, fusion aids, filler, fibrous reinforcing agents and antistatic agents.

Exemplary lubricants are polyglycerols of di- and trioleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Optimization of the particular lubricant composition is not within the scope of the present invention and can be determined easily by one of ordinary skill in the art. Preferably, an oxidized polyethylene is used. An example of an oxidized polyethylene is AC 629, sold by Allied Signal. Lubricants can be used in the amount of about 0.01 to about 5 parts by weight of lubricant per 100 parts of the Two Step CPVC Resin. Preferably from about 0.4 to about 2.0 parts by weight of lubricant per 100 parts of Two Step CPVC Resin are used.

The tin stabilizer used in the present invention can be any stabilizer containing tin. Suitable stabilizers include tin salts of monocarboxylic acids such as stannous maleate. Additionally, organo-tin stabilizers such as dialkyl tin mercaptides, carboxylates, and thiazoles can be used. Examples of such organo-tin stabilizers include without limitation: dibutyltin dilaurate, dibutyltin maleate, di(n-octyl) tin maleate, dibutyl tin bis(2-ethylhexyl mercaptoacetate), dibutyltin bis(lauryl mercaptide), dibutyltin, S,S-bis(isooctyl thioglycoate), dibutyltin β-mercaptoproprionate, di-n-octyltin S,S-bis(isooctyl thioglycolate), and di-n-octyltin β-mercaptoproprionate. Usually from about 1 to about 5 parts by weight of stabilizer per 100 parts by weight of the Two Step CPVC Resin is used in the composition. Most preferably, the composition uses between 2 and 4 parts by weight of dibutyl tin bis(2-ethylhexyl mercaptoacetate) per 100 parts of the Two Step CPVC Resin. This stabilizer is commercially available as Mark 292-S from Witco Chemical and Thermolite 31 HF from Elf Atochem.

Co-stabilizers may be included, if desired, but are not necessary. However, if a solid co-stabilizer is added, the particle size of the co-stabilizer must be small enough so as not to affect the impact properties of the unique compound. Examples of co- stabilizers include metal salts of phosphoric acid, polyols, epoxidized oils, and acid acceptors which are not detrimental to the base Two Step CPVC Resin used. The stabilizers can be used by themselves or in any combination as desired. Specific examples of metal salts of phosphoric acid include water-soluble, alkali metal phosphate salts, disodium hydrogen phosphate, orthophosphates such as mono-,di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Examples of possible acid acceptors include potassium citrate, aluminum magnesium hydroxy carbonate hydrate, magnesium aluminum silicates and alkali metal alumino silicates. An example of commercially available aluminum magnesium hydroxy carbonate hydrate is Hysafe 510, available from the J. M. Huber Company. Examples of magnesium aluminum silicates are molecular sieves, whereas examples of alkali metal alumino silicates are zeolites. The most preferred co-stabilizer, if used at all, is disodium hydrogen phosphate (DSP) and is used by treating the Two Step CPVC Resin itself, after the resin has been chlorinated. Typical levels of co-stabilizers can range from about 0.1 weight parts to about 7.0 weight parts per 100 weight parts of the Two Step CPVC Resin, if used at all. DSP is commercially available from The Monsanto Company.

Suitable processing aids include acrylic polymers such as methyl acrylate copolymers. An example of an acrylic process aid is Acryloid KM 330 sold by Rohm & Hass, Inc. Other process aids include Paraloid K 120ND, K-120N, K-175; all available from Rohm & Haas. A description of other types of processing aids which can be used in the compound can be found in The Plastics and Rubber Institute: International Conference on PVC Processing, April 26–28 (1983), Paper No. 17. In some embodiments, no processing aid is necessary, but if used, the processing aid should be used in the amount of 0.5 to about 3.0 by weight of processing aid per 100 parts of the Two Step CPVC Resin.

For certain embodiments of the invention, lower molecular weight CPVC resins, whether formed by conventional processes or the Two Step Process, can function as a process aid. These include CPVC resins having an inherent viscosity in the range of about 0.45 to about 0.80, preferably about 0.50 to 0.70. Specific examples include TempRite 679×705 sold by The B. F. Goodrich Company (TempRite is a trademark of The B. F. Goodrich Co.). If used, a lower molecular weight CPVC resin should be blended in an amount to 50 weight % based on the total amount of CPVC resin, preferably about 10 to about 30% by weight.

Examples of antioxidants to be used in the compound include Irganox 1010 (tetrakis[methylene(3,5-di-tert-butyl-4-hydoxy-hydrocinnamate)]methane) sold by Ciba Geigy. The antioxidant is used in the amount of about 0.25 to about 5.0 parts by weight per 100 parts of the Two Step CPVC Resin, if used at all.

Suitable pigments include among others titanium dioxide, and carbon black. If included, the pigments are used generally in the amount of about 0.5 to about 10.0 parts by weight per 100 parts of the Two Step CPVC Resin. The preferred titanium dioxide is Tiona RCL-6 from SCM Pigments.

Suitable fillers include calcium carbonate, talc, clay, mica, wollastonite, silicas, and other filling agents. If used in the compound, the amount of filler used is the range of about 0.5 to about 10.0 parts by weight of filler per 100 parts of the Two Step CPVC Resin.

The components of the unique CPVC compound can be made in any manner wherein the various components are added together and mixed under heat. For example, the appropriate amount of the Two Step CPVC Resin can be added to a vessel such as Henschel mixer or a ribbon blender. The remaining ingredients of the compound can then be added thereto and mixed. If pellets are to be formed, the compound can be melt mixed. Melt mixing can generally occur in the temperature range of about 150 to about 250° C. Once the blend is formed, it can be processed further depending upon the desired application in any conventional manner, using extrusion or molding techniques.

If extrusion techniques are used to process the composition of the present invention, generally conventional extrusion machinery such as a multi-screw extruder or a single screw extruder are used. An extruder generally has conveying means, an intermediate screw processing means and a final die through which the material is discharged in the form of an extrudate. Generally, a multi-screw extruder is used for the extrusion of pipe. Examples of possible conventional extruders to be used to process the CPVC compound of the instant invention include the following twin screw counter-rotating extruder models from Cincinnati Milacron: CM 35HP, CM 55HP, CM 65HP, CM 80HP, CM 92HP. Examples of suitable conical twin screw extruders from Krauss Maffei include KMD-2/ 40KK and KMD-2/50KK.

Once the CPVC compound is made according to the instant invention, it can be formed into any article desired. These articles will have a heat deflection temperature of at least 212° F. and have good chemical resistance. Examples include but are not limited to pipe, fittings, valves, sheets, injection molded and thermoformed industrial parts, appliance housing, and different containers.

The following non-limiting examples serve to further illustrate the present invention in greater detail.

EXAMPLES

Example 1

This Example sets forth the method to make the Two Step CPVC Resin used in all the Examples, although all three resins have a different chlorine content. The process will be described for the 69.5 % chlorine level Two Step CPVC resin; Tables 1 and 2 below will indicate the conditions for the other two resins used in this application. A 200 gallon glass-lined reactor is charged with 140 gallons of de-ionized water, 200 pounds of Geon 103EP F-76 TR PVC (available from The Geon Company), and 40 grams of Lupersol Delta X-9 MEK peroxide (available from Atochem). The reactor was closed and pressurized with nitrogen to 230 psig. The reactor was vented and pulled under vacuum (<1 psia) for fifteen (15) minutes. 157 lbs. of liquid chlorine at room temperature was then charged to the reactor. Next, heat was applied to the reactor jacket as shown in FIG. 1. There is a substantial lag time during which the jacket of the reactor is being heated up. The relative pressure initially rises because much of the liquid chlorine charge remains in solution while the reaction mass is being heated. The relative pressure curve begins to fall after the reaction mass reaches 30° C. and the chlorine is consumed rapidly as seen by the precipitous drop of the relative pressure. The relative pressure levels out at 0.18 at 95° C. indicating the end of the first step.

600 grams of 3 weight percent (wt. %) hydrogen peroxide was then injected into the reactor at 95° C. The relative pressure of the reactor then immediately began to drop. The reactor was then heated to 113° C. where the relative pressure leveled out to 0.01. This is the end of the second step. The entire reaction time was approximately 80 minutes. The reactor was then cooled to 60° C. and depressurized to 15 psia. The slurry was then filtered, washed with de-ionized water, neutralized to a pH between 7–8 with sodium carbonate and dried in a hot air oven.

TABLE 1

| % Cl, Two Step CPVC Resin | PVC, lbs. Resin | gms. of Lupersol Delta X-9 MEK | gallons of de-ionized water | lbs. Chlorine | gms., 30 wt. % hydrogen peroxide |
|---|---|---|---|---|---|
| 67.3% | 250 | 40 | 140 | 153 | 30 |
| 70.6% | 175 | 40 | 140 | 153 | 60 |

TABLE 2

| % Cl, Two Step CPVC Resin | Relative Pressure, 1st Step | Relative Pressure, 2nd Step | Reaction Time, min. |
|---|---|---|---|
| 67.3% | 0.18 | 0.01 | 73 |
| 70.6% | 0.22 | 0.017 | 65 |

For the 70.6% chlorine Two Step CPVC Resin, the reactor was cooled to 80° C. The residual chlorine in the reactor was reacted with 1270 grams of 30 wt. % hydrogen peroxide, after which, it was cooled to 60° C. and treated as described above.

Example 2

In this example, three different compounds of the instant invention were made using the Two Step CPVC Resins as described in Example 1, having three different chlorine levels, 67.3%, 69.5% and 70.6% chlorine, respectively.

The 67.3% chlorine Two Step CPVC Resin compound was mixed in a Banbury mixer, where all the ingredients were smoothly integrated. When the temperature of the melt reached about 420° F., the melt was removed and worked on a Farrell 8"×16" mill in which the front roller was set at 420° F. and the back roller was set at 410° F. Plaques were made from the material and compression molded to a thickness of ⅛ and ¼ inch using a hot oil press set at 410° F. Bars were cut for testing for Notched Izod according to ASTM D 256-93 A, tensile strength according to ASTM D638-94 B and the Heat Deflection Temperature (HDT) at 264 psi according to ASTM D-648.

The two compounds using the 69.5% chlorine and 70.6% chlorine Two Step CPVC Resin were made in the following manner. The ingredients were mixed in the Farrel intensive mixer, removed at 420° F. and worked on the KSBI $10^{11} \times 20^{11}$ mill with the front roller set at 430° F and the back roller set at 420° F. Plaques were then cut out of the worked material and compression molded to ⅛ inch and ¼ inch thickness using the following Wabash press conditions:

| | |
|---|---|
| Pressure setting | 50 tons |
| Pressure Temperature | 410° F. |
| Low pressure | 6 minutes |
| High pressure | 3 minutes |
| Pre-bump dwell | 15 seconds |
| Dwell between bumps | 5 seconds |
| Bump open time | 8 seconds |
| Bump counter | 2 |

Bars were cut from the final plaques for HDT testing and annealing. The 67.3% chlorine compound was annealed for 24 hours at 110° C.; the 69.5% chlorine compound was annealed for 24 hours at 115° C., whereas the 70.6% chlorine compound was annealed for 24 hours at 120° C. Bars were also cut for testing for Notched Izod according to ASTM D 256-93 A, tensile strength according to ASTM D638-94 B and the Heat Deflection Temperature (HDT) at 264 psi according to ASTM D-648. The DTS experiments were performed using a Haake Rheocord 90. The results are summarized in the Table 3 below.

TABLE 3

| | | 2 Step CPVC Resin (67.3%) | 2 Step CPVC Resin (70.6%) | 2 Step CPVC Resin (69.5%) |
|---|---|---|---|---|
| CPVC Resin | | 100 | 100 | 100 |
| Dibutyl tin bis-(2-ethylhexylmercaptoacetate) | | 2.4 | 3.0 | 2.4 |
| TiO$_2$ | | 5.0 | 5.0 | 5.0 |
| CPE, Tyrin 2000 | | 4.0 | 7.0 | 4.0 |
| Polyorganosiloxane, Metablen S-2001 | | 4.0 | 4.0 | 4.0 |
| Oxidized Polyethylene | | 0.75 | 1.0 | 1.0 |
| Fischer Tropsch Wax | | 0.5 | 0.5 | 0.5 |
| PROPERTIES | | | | |
| 1/4" Notched Izod, 23° C. (ft-lb/.in.) | | 1.83 | 2.36 | 1.74 |
| 1/8" Tensile Strength, 23° C. (psi) | | 7730 | 7120 | 7860 |
| 1/8" Tensile Elongation, 23° C. (%) | | 56.4 | 4.74 | 5.59 |
| 1/8" Tensile Modulus, 23° C. (kpsi) | | 375 | 376 | 373 |
| 1/8" HDT (° C.), annealed (24 hrs. at designated temperature) | | 112.5(100° C.) | 131.0(120° C.) | 126.7(115° C.) |
| DTS-210° C., 35 RPM, 76 gm. Cubes for 67.3% Cl and 69.5% Cl Two Step CPVC Resin and 82 gm. Cubes for 70.6% Cl Two Step | Min. Torque (m-gm) | 2550 | 2750 | 2650 |
| | Time to Min. Torque (Min) | 5.2 | 5.2 | 4.5 |
| | Temp at Min. Torque | 223 | 230 | 230 |

Example 3

In this example, the environmental stress cracking of the compound of the instant invention was tested. Environmental stress cracking is a failure mechanism used for thermoplastics in which the material in the presence of an environmental stress cracking agent fails at lower stresses and/or shorter times than would be predicted by the properties of the material. In the absence of stress, an environmental stress cracking agent has no noticeable effect on the strength of the material. Tensile bars used in the test were type IV bars from ASTM D638. The experiments are carried out at room temperature following the protocal set forth in ASTM D2990, sections 6.4, 10.2.1.1, 11.1, 11.3, 11.4, 11.4.1, 12.1, and 12.5 for creep rupture. The samples are tested in both water which is used as the control as well as stress cracking chemicals. The stress cracking chemical used in these experiments were propylene glycol and ethylene glycol. For these experiments in addition to the compound made according to the instant invention using 67.3% Cl Two Step CPVC Resin, bars made from commercial CPVC compounds were also tested. In particular, TempRite 3104 CPVC, from The B. F. Goodrich Company was also tested. (TempRite is a registered trademark of The B. F. Goodrich Company). In addition, the following comparative compound (hereinafter "Comparative Compound") was formulated only for comparison purposes and also tested:

- 100 parts of TempRite 674×571 CPVC (67.3% photo-slurry resin)
- 2.4 parts of Dibutyl tin bis-(2-ethyl hexyl mercaptoacetate)
- 5.0 parts of Tiona RCL-6 (titanium dioxide)
- 4.0 parts of Metablen S-2001 (impact modifier containing polyorganosiloxane)
- 4.0 parts of Tyrin 2000 (CPE)
- 0.75 parts of AC 629-A (oxidized polyethylene)
- 0.5 parts of Fischer-Tropsch synthetic hard wax (available from Durachem)

Figure 2:
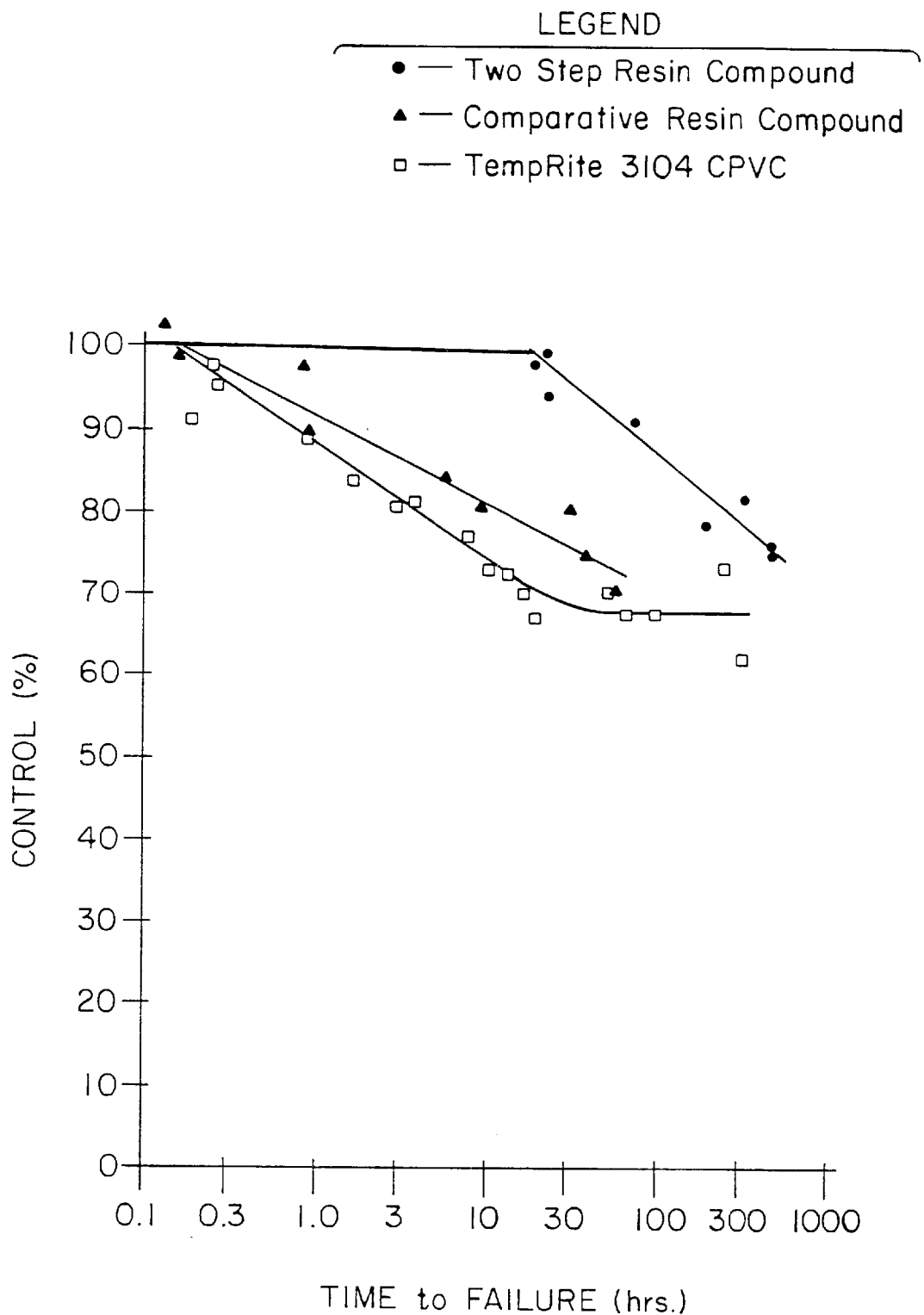
FIG. 2 graphically illustrates the relative environmental stress cracking results in propylene glycol at 23° C. for a compound formed from a Two Step CPVC Resin (as hereinafter defined) having 67.3% chlorine content according to the instant invention as compared to conventional CPVC compound.
Figure 3:
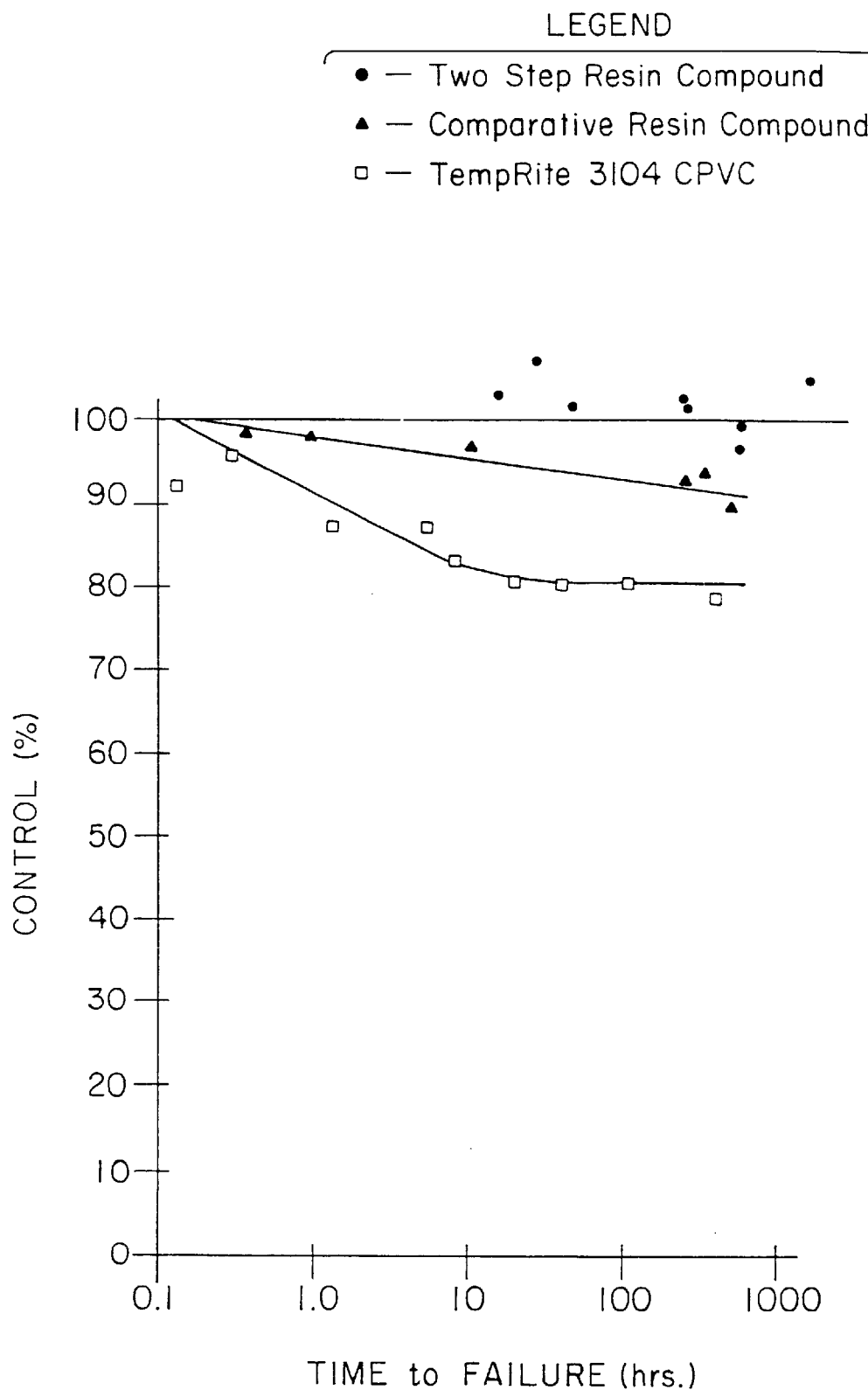
FIG. 3 graphically illustrates the relative environmental stress cracking results in ethylene glycol at 23° C. for a compound formed from a Two Step CPVC Resin (as hereinafter defined) having 67.3% chlorine content according to the instant invention as compared to conventional CPVC compound.

The data for the test results is plotted in FIGS. 2 and 3. The results are plotted as stress versus time to break on a log-log scale. In order to enable comparison between the different compounds, the data is normalized relative to the control stress which is water. The critical stress and critical time are then determined by the intersection of lines which can be drawn through the transition region and the final leveled off region. The results from the testing in ethylene glycol indicate that both TempRite 3104 CPVC and the Comparative Compound exhibited signs of stress cracking in less than about 5 minutes as evidenced from the deviation from the control line. Only TempRite 3104 CPVC showed a critical time and critical stress level of about 15 hours and 80% respectively. The Comparative Compound did not exhibit a critical time or stress level for testing up to 500 hours, indicating that it has better stress cracking resistance. However, the stress level was reduced to 90% of the control. Only the compound made according to the instant invention using the Two Step CPVC Resin did not exhibit any signs of stress cracking for testing up to about 1500 hours. The data shows that the compound of the instant invention has improved chemical resistance.

The results from testing in propylene glycol indicate that both TempRite 3104 CPVC and the Comparative Compound showed signs of stress cracking in about ten (10) minutes. TempRite 3104 CPVC exhibited a critical time and stress level of about 30 hours and 65% respectively. The Comparative Compound appears to correlate with TempRite 3104 CPVC. The compound of the instant invention using the Two Step CPVC Resin exhibited signs of stress cracking only after about 15 hours of testing. This data also shows that the compound of the instant invention has improved chemical resistance.

Example 4

In addition, the compound of the instant invention was extruded into pipe. All three compounds listed above in Example 2 were extruded into pipe (¾ inch SDR-11 CTS tubing) using a Cincinnati Milacron CM55 HP extruder. The extruder was set at the following conditions in Table 4. Pipe conformed to dimension in ASTM D 2846.

TABLE 4

|  | 67.3% Cl Two Step Compound | 69.5 & 70.6% Cl Two Step Compound |
| --- | --- | --- |
| Barrel Zones | 360–365° F. | 365–410° F. |
| Die Zones | 360–380° F. | 365–395° F. |
| Screw rpm | 31 (high rate) 21 (low rate) | 16 |
| Screw | C513A | CM511 |
| Head Inventory | <1.5 lb. | <1.5 lb. |

The following results in Table 5 were obtained. The Vise Crush was measured using ASTM F441, Section 8.5. The Staircase impact procedure was measured by ASTM D2444, Appendix 3.

TABLE 5

| Pipe Run/Melt temperature | Conditions | Vise Crush 60% Comp/Full | Staircase Impact |
| --- | --- | --- | --- |
| 67.3% Cl (413° F.) | 145#/hr | 3/3 3/3 | 28.0 ± 7.0 |
| 67.3% Cl (438° F.) | 203#/hr | 3/3 3/3 | 35.4 ± 1.9 |
| 69.5% Cl (463° F.) | 148#/hr | 3/3 3/3 | 24.7 ± 4.7 |
| 70.6% Cl (464° F.) | 145#/hr | 3/3 3/3 | 23.7 ± 9.2 |

These results show that the pipe formed from the compound of the instant invention has acceptable staircase impact values. Furthermore, the data shows that as the rate is increased, the staircase impact values did not decrease. Additionally the data shows that a compound having a high heat deflection temperature can be successfully extruded into a pipe having acceptable properties.

Example 5

In this Example, five compounds were made. One of the compounds is a comparative compound formed in accordance with the example in U.S. Pat. No. 5,604,278 to Hartitz.

TABLE 6

|  | A | B | C | D | Comparative |
| --- | --- | --- | --- | --- | --- |
| TempRite 674 × 705 CPVC | — | — | — | — | 100 |
| 2 Step CPVC Resin, 69.5% | 100 | 100 | 100 | 100 |  |
| Dibutyl tin bis-(2-ethylhexylmercaptoacetate) | 2.4 | 2.4 | 2.4 | 2.4 | 2.4 |
| CPE, Tyrin 2000 | 4.0 | 4.0 | 4.0 | 4.0 |  |
| CPE1-Tyrin 3611P |  |  |  |  | 2.0 |
| CPE2-Tyrin 4211P |  |  |  |  | 1.5 |
| Oxidized Polyethylene | 1.0 | 1.0 | 1.0 | 1.0 | 1.0 |
| Fischer Tropsch Wax | 0.5 | 0.5 | 0.5 | 0.5 | 0.5 |
| Metablen S-2001 Impact Modifier | 4.0 |  |  |  |  |
| Blendex 310 ABS Impact Modifier |  | 4.0 |  |  |  |
| Kaneka B-22 MBS Impact Modifier |  |  | 4.0 |  |  |
| Paraloid 334 Acrylic Impact Modifier |  |  |  | 4.0 |  |
| Paraloid KM330 |  |  |  |  | 4.0 |
| TiO$_2$ | 5.0 | 5.0 | 5.0 | 5.0 | 5.0 |

The following properties were found in accordance with the ASTM standards set forth above.

TABLE 7

|  | A | B | C | D | Comparative |
|---|---|---|---|---|---|
| ¼" Notched Izod, 23° C. (ft-lb/in) | 2.20 ± 11 | 1.60 ± 0.14 | 1.65 ± 0.25 | 1.72 ± 0.11 | 1.38 ± 0.19 |
| ⅛" Tensile Strength, 23° C. (psi) | 7650 ± 77 | 8480 ± 112 | 8280 ± 52 | 8250 ± 77 | 8335 ± 25 |
| ⅛" Tensile Elongation, 23° C. (%) | 14.5 ± 4.0 | 13.6 ± 4.8 | 22.8 ± 10.8 | 13.6 ± 1.8 | 10.6 ± 6.7 |
| ⅛" Tensile Modulus, 23° C. (Kpsi) | 390 ± 4.1 | 409 ± 8.1 | 383 ± 13.9 | 378 ± 14.2 | 449 ± 11.5 |
| ⅛" HDT (° C.), annealed 24 Hrs at 115° C. | 128 ± 0.0 | 127 ± 0.0 | 128.5 ± 0.5 | 128.5 ± 0.5 | 127.5 ± 0.5 |
| DTS-210° C. 35 RPM, 82 g.cubes — Min. Torque (m-gm) | 2490 | 2700 | 740 | 2280 | 2500 |
| Time to Min. Torque (Min.) | 5.6 | 5.6 | 4.8 | 6.6 | 5.3 |
| DTS Temp. (° C.) | 231 | 232 | 231 | 231 | 229 |

DTS experiments were performed on the Haake Rheocord 90.

These results show that the overall properties of the novel Two Step compound using various impact modifiers are better than those of the comparative example.

Example 6

The compounds set forth in Example 5 were formed into 2" by 2" by ⅛" plaques. These plaques were exposed in hot air ovens (Precision Scientific Compounding Catalog Number 1240) at 225° F. for a period of four months. The oven conformed to ASTM E-145 (Standard Specifications for Gravity-Convection and forced Ventilation Ovens). The plaques were then subject to drop weight impact testing (according to ASTM D3763-93). A Rheometrics RDT 5000 was used for the drop weight test. The conditions were as follows:

Dart weight—23 lb.
Dart Nose Diameter—0.5 in.
Sample Support Ring—1.0 in.
Testing Temperature—23° C.

TABLE 8

Control-Not Aged at All

| Sample | Impact Velocity in/s. | Energy to Peak* Force, Defined in ISO 6603-2:1989(E) |
|---|---|---|
| Comparative | 116 ± 1 | 29 ± 16 |
| A | 116 ± 1 | 172 ± 67 |
| B | 116 ± 1 | 145 ± 87 |
| C | 116 ± 1 | 57 ± 21 |
| D | 116 ± 1 | 179 ± 88 |

TABLE 9

Aged

| | | |
|---|---|---|
| Comparative | 116 ± 1 | 9 ± 7 |
| A | 116 ± 1 | 58 ± 15 |
| B | 116 ± 1 | 20 ± 9 |
| C | 116 ± 1 | 14 ± 2 |
| D | 116 ± 1 | 22 ± 15 |

These results show that the compounds of the instant invention perform better when subject to oven aging experiments than the Comparative Example as evidenced by larger Energy to Peak Force values in both the not aged and aged samples.

Example 7

The recipe for Two-Step CPVC (69.5%) was compared to the Example set forth in U.S. Pat. No. 5,604,278 to Hartitz. The two compounds were compounded (powder form) and extruded (¾ inch SDR-11 cts tubing) under conditions set forth in Table 4 for 69.5% Cl resin. The pipe dimensions satisfied the criteria specified in ASTM D 2846. Short Term (~250 hrs.) and medium term (~2000 hrs.) hydrostatic testing was conducted at 203° F. to predict the 100,000 hr. intercept point known as the long term hydrostatic strength (LTHS) value. This value is the estimated tensile stress in the wall of the pipe in the circumferential orientation that when applied continuously will cause failure of the pipe at 100,000 hours. The LTHS is categorized according to Table 1 of ASTM D 2837 to yield the hydrostatic design basis (HDB) of the material. A LTHS between 960–1190 psi-hs falls into the 1000 psi-hs category. A LTHS between 760–950 psi-hs falls into the 800 psi-hs category. The hydrostatic design strength is the HDB multiplied by a safety factor of 0.5. Hence, for the above values of 1000 psi-hs and 800 psi-hs, the hydrostatic design strength are 500 psi-hs and 400 psi-hs, respectively.

TABLE 10

| | Small Head (1.5 lbs.) | | | Large Head (5–7 lbs.) | | |
|---|---|---|---|---|---|---|
| | STHS ~250 Hrs. (psi-hs) | MTHS ~2000 Hrs. (psi-hs) | MIAK Fusion Test | STHS ~250 Hrs. (psi-hs) | MTHS ~2000 Hrs. (psi-hs) | MIAK Fusion Test |
| Comparative | 1022 | 947 | Fail | 960 | 838 | Fail |
| 2 Step CPVC Resin | 1044 | 1016 | Pass | 912 | 874 | Fail |

From Table 10, it is clear that only the Two-Step compound extruded using the smaller head meets the 500 psi-hs hydrostatic design strength criteria around 2000 hours of testing at 203° F. The comparative compound extruded under similar conditions initially meets the criteria after approximately 250 hours of testing, but fails after further testing. The smaller amount of material in the extruder (less than about 1.5 pounds) head enhances polymer processing conditions when compared to a larger amount of material in the extruder head (between approximately 5–7 pounds).

A fusion test using dry methyl iso-amyl ketone (MIAK) was also performed on the above compounds. Extruded pipe samples were immersed in dry MIAK for several days at room temperature. A pipe sample that only swells in MIAK is considered to be well fused and passes the test. A pipe sample that flakes, swells and flakes or disintegrates is considered to be not well fused and therefore fails the test. A reference similar to this test for PVC is ASTM D 1785, Section 6.6. The solvent used in this test is not capable of distinguishing for CPVC samples. Only the novel Two-Step resin compound extruded using the small inventory head passes the MIAK test, indicating that it is well fused.

Example 8

| Ingredient | A | B |
|---|---|---|
| Two-Step Resin (70.6% Cl) | 100 | — |
| Water Slurry Resin (73.3% Cl) | — | 100 |
| Organo Tin Stabilizer-Mark 1044 from Witco | 3.5 | 3.5 |
| Oxidized Polyethylene | 1.0 | 1.0 |
| Fischer Tropsch Wax | 0.5 | 0.5 |
| CPE, Tyrin 3615P | 4.0 | 4.0 |
| Metablen S-2001 Impact Modifier | 2.0 | 2.0 |
| Irganox 1010 Antioxidant | 0.25 | 0.25 |
| $TiO_2$ | 5.0 | 5.0 |

Both of these resins have a $T_g$ of approximately 164° C. so the final HDT values will be the same. A detailed 73.3% Cl resin was made via the process described in U.S. Pat. No. 4,412,898. A detailed description on $T_g$ analysis can be found in U.S. Pat. No. 5,340,880. The ingredients were mixed in a Farrel intensive mixer and removed at 420° F. The Two-Step resin compound fluxed nicely when dropped from the Farrel mixer. The Water Slurry resin compound did not band when dropped at 420° F., instead, it was partially powdery. This shows that the Two-Step resin compound will process better than the same compound using a Water Slurry process resin.

The same two compounds were also examined for processability using a Haake Rheocord 90. 82 gms of each compound (powder form) were loaded into the Haake and processed. Results are shown in the below table.

| | | A | B |
|---|---|---|---|
| DTS-210° C., 35 RPM, 82 gm. load. | Maximum Torque (m-gm) | 3250 | 3110 |
| | Time to Maximum Torque (min) | 1.8 | 3.6 |
| | Minimum Torque (m-gm) | 2500 | 2640 |
| | Time to Minimum Torque (min) | 9.3 | 8.7 |
| | Temp. (° C.) | 234 | 234 |

The data shows that it took half as long for the Two Step CPVC Resin compound to reach the maximum torque point on the DTS curve once again showing that it is easier to process the Two-Step CPVC Resin compound.

In summary, a novel and unobvious CPVC compound has been described as well as an article made from such compound. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims.

What is claimed is:

1. An article formed from CPVC compound which meets or exceeds ASTM D 1784 cell class 23447, has a hydrostatic design basis or 1,000 psi-hs according to ASTM D 2837 at approximately 2.000 hours of testing at 203° F. and when the compound is formed into plaques, has a heat deflection temperature measured according to ASTM D 648 at 264 psi of about at least 250° F. wherein said compound comprises a CPVC resin formed by a two-step process in an aqueous suspension comprising in the first step chlorinating granular microporous polyvinyl chloride having a chlorine content of about 57% at a starting temperature in the range of 30° to 75° C. in the absence of liquid chlorine and free oxygen, but in the presence of at least a stoichiometric amount of chlorine, but less than 10% excess over that required to produce the CPVC end product and a catalytic amount of organic peroxy catalyst sufficient to produce the first step CPVC having an intermediate Cl level of chemically bound chlorine in the range of 64 to 72% by weight, said peroxy catalyst having a 10 hour half life in the range of 30° to 130° C. and in a second step further chlorinating the CPVC formed in the first step, in the presence of at least a stoichiometric amount of chlorine but less than 10% excess over that required to produce the CPVC end product at a temperature in the range of 90° to 130° C. and having a chlorine content of 67 to 75%; a chlorinated polyethylene and an impact modifier chosen from the group consisting essentially of acrylic modifier chosen from the group consisting essentially of acrylic impact modifiers, methacrylate-butadiene-styrene impact modifiers, or acrylonitrile-butadiene-styrene impact modifiers and mixtures thereof.

2. An article according to claim 1, wherein said article has notched Izod measured according to ASTM D 256-93A of at least 2.30 ft.-lb./in.

3. An article according to claim 1, wherein said article has notched Izod measured according to ASTM D 256-93A of at least 1.7 ft.-lb./in.

4. An article according to claim 1 wherein said article does not show any stress cracking in ethylene glycol for at least 1500 hours according to the procedures set forth in ASTM D2990.

\* \* \* \* \*